(12) United States Patent
Dolgin et al.

(10) Patent No.: US 8,510,048 B2
(45) Date of Patent: Aug. 13, 2013

(54) METHOD FOR DETECTING UNDERGROUND TUNNELS

(75) Inventors: Benjamin P. Dolgin, Alexandria, VA (US); Clayton P. Davis, Springfield, VA (US)

(73) Assignee: Raytheon Company, Waltham, MA (US)

( * ) Notice: Subject to any disclaimer, the term of this patent is extended or adjusted under 35 U.S.C. 154(b) by 212 days.

(21) Appl. No.: 13/012,153

(22) Filed: Jan. 24, 2011

(65) Prior Publication Data

US 2012/0186342 A1 Jul. 26, 2012

(51) Int. Cl.
*G01V 3/38* (2006.01)
*G01B 7/00* (2006.01)

(52) U.S. Cl.
USPC .............................................. 702/5; 702/155

(58) Field of Classification Search
USPC ........................ 702/147, 5, 6, 155, 156, 189
See application file for complete search history.

(56) References Cited

U.S. PATENT DOCUMENTS 6,744,911 B1 * 6/2004 Avila et al. .................... 382/131

OTHER PUBLICATIONS

Paolo Mauriello and Domenico Patella, "Integration of Geophysical Datasets by a Conjoint Probability Tomography Approach: Application to Italian Active Volcanic Areas", Annals of Geophysics, vol. 51, N. 1, Feb. 2008, pp. 167-180.
Anestis J. Romaides, James C Battis, Roger W. Sands, Alan Zorn, Donald O. Benson Jr., and Daniel J. Difrancesco, "A Comparison of Gravimetric Techniques for Measuring Subsurface Void Signals", Institute of Physics Publishing, Journal of Physics D: Applied Physics, 34, Copyright 2001, pp. 433-443.
J.F. Vesecky, W.A. Nierenberg, and A.M. Despain, "Tunnel Detection", SRI International, Apr. 1980, 109 pages.

* cited by examiner

*Primary Examiner* — Marc Armand
*Assistant Examiner* — Ricky Ngon
(74) *Attorney, Agent, or Firm* — Cantor Colburn LLP

(57) ABSTRACT

A method for detecting tunnels within an area comprising in one embodiment the steps of providing horizontal tensor gravity gradients for the area, calculating a plurality of gravity gradient vector field pairs from the horizontal tensor gravity gradients, each gravity gradient vector field pair including one gravity gradient vector field and a respective orthogonal gravity gradient vector field, detecting dipolar points and polar source points in each of the one and respective orthogonal gravity gradient vector fields for each gravity gradient vector field pair, identifying the polar source points that are present in one but not in both of the one gravity gradient vector field and the respective orthogonal gravity gradient vector field for each gravity gradient vector field pair to identify endpoints, and distinguishing the endpoints resulting from surface features from the endpoints resulting from tunnels. The polar source points form the endpoints of the tunnels.

13 Claims, 3 Drawing Sheets

METHOD FOR DETECTING UNDERGROUND TUNNELS

TECHNICAL FIELD OF THE DISCLOSURE

This disclosure relates generally to the detection of underground voids. More particularly, this disclosure relates to a method for detecting underground oblong voids indicative of tunnels.

BACKGROUND OF THE DISCLOSURE

The detection of underground voids is an area of growing importance within the mining, oil and gas, construction, and defense industries. For example, as with construction, the detection of old underground tunnels is necessary in areas where buildings are being built. Further to this point, the detection of water mains made of wood or concrete, as well as old collapsed basements or storage tanks is equally required during construction projects. In general, there is an ever-growing need for new and improved ways to detect underground tunnels of various sorts. Currently, beyond detections made visually at the ground site, underground tunnel detections are attempted by way of a variety of single sensor and multi-sensor approaches utilizing a broad spectrum of technologies. Some of the traditional technologies include seismic-acoustic methods utilizing compressional seismic (P) waves, electromagnetic and resistivity, ground penetrating radar, and magnetic methods. Some of the more recently developed approaches utilize microgravity and subsurface interface radar.

The seismic-acoustic methods typically utilize compressional seismic (P) waves propagating between sources and sensors positioned within vertical boreholes at depths near suspected tunnel depths. Likewise, electromagnetic methods utilize electromagnetic (EM) waves propagating between sources and sensors positioned within vertical boreholes at depths near suspected tunnel depths. The added requirement for boreholes only adds to the time and expense required to get data for interpretation. Still further, ground penetrating radar, subsurface interface radar and gravity related technical approaches may be somewhat advantageous since they may alleviate the need for boreholes. However, all of the current technologies being utilized toady in the mining, oil and gas, and defense industries for detecting underground tunnels contain various inherent problems such as excessive clutter, excessive signal loss due to varying soil/rock mediums, and excessive false positives and false negatives due to the inhomogeneities present underground. These inherent problems all serve to complicate and prevent reliable tunnel detection in the current mining, oil and gas, and defense industries.

The outputs of these various technologies typically provide sensed data in the form of a measured signal or an image representative of reflections and variations caused by the soil being scanned/sensed but do not actually provide an image of the tunnel itself. Typically, such output data first has to be interpreted through visual inspection by highly trained analysts before any determinations are formed. The interpretations are generally very subjective and highly unreliable. Processing rates tend to be very slow (measured in months) with an extremely high occurrence of false positives and false negatives. Hence, formal methods are still required to sort through the various noise and clutter so to accurately and reliably interpret the sensed data.

Accordingly, there exists a long felt need for an improved technology and method for detecting underground tunnels that alleviates the known inherent problems present within the technologies and methods currently being utilized today for tunnel detection in the various industries.

SUMMARY OF THE DISCLOSURE

According to one embodiment of the present disclosure, a method for detecting underground tunnels is presented having a series of steps that comprises first calculating a plurality of gravity gradient vector field pairs for an area, each gravity gradient vector field pair being comprised of two vector fields that are orthogonal to one another. Next, a probability tomography analysis for source pole occurrence probability (SPOP) is performed on each of the plurality of gravity gradient vector field pairs. After performing the probability tomography analysis, the dipolar points and polar source points in each gravity gradient vector field pair are then detected. From the detected polar source points, the polar source points that are present in one but not in both of the two vector fields for each of the plurality of gravity gradient vector field pairs are identified to thereby detect the tunnels. Detection of tunnels in accordance with the teachings of the present disclosure may serve to alleviate some of the delays and false readings currently being experienced with the technologies and methods used today in the industry. Still further, tunnel detections in accordance with the teachings of the present disclosure may provide a more revealing tunnel signature.

In one embodiment of the present disclosure, the gravity gradient vector field pairs may be calculated from the horizontal tensor gravity gradients for the area in question and then processed to estimate the source pole occurrence probability based on the gravity of equivalent masses. By utilizing a probability tomography analysis to estimate the source pole occurrence probability for each of the gravity gradient vector fields in each pair, the subsurface density variations (SSDV), i.e., clutter, commonly experienced with the use of other technologies may be greatly reduced thereby providing for more efficient and reliable tunnel detections.

Accordingly, some embodiments of the disclosure may provide numerous technical advantages. Some embodiments may benefit from some, none or all of these advantages. For example, a technical advantage of one embodiment of the disclosure may be the reduction of clutter in the gravity gradient vector field pairs. Furthermore, the reduction of clutter in the resulting gravity gradient vector field pairs may provide for faster tunnel detection rates as well as provide a reduced occurrence of false readings. Still further, the reduction of clutter may provide a more enhanced and recognizable tunnel signature that depicts the actual tunnel orientation.

Another example of a potential technical advantage of one embodiment of the present disclosure is that it may provide the ability to more readily distinguish surface features responsible for generating tunnel-like signatures from the signatures of actual tunnels. Many current tunnel detection technologies and methods struggle with such determinations due to the extent of distortion and clutter present within their readings.

Although specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description. The foregoing has outlined rather broadly some of the more pertinent and important advantages of the present disclosure in order that the detailed description of the disclosure that follows may be better understood so that the present contribution to the art can be more fully appreciated. It should be appreciated by those skilled in the art that the conception and the specific embodiment disclosed may be readily utilized as a basis for modifying or designing other structures for carrying out the same purposes of the present disclosure. It should also be realized by those skilled in the art that such equivalent constructions do not depart from the spirit and scope of the present disclosure as set forth in the appended claims.

BRIEF DESCRIPTION OF THE DRAWINGS

For a fuller understanding of the nature and possible advantages of the present disclosure, reference should be had to the following detailed description taken in connection with the accompanying drawings in which.

Similar reference characters refer to similar parts throughout the several views of the drawings.

DETAILED DESCRIPTION OF THE EXAMPLE EMBODIMENTS

Borrowing from conventional electrostatic field theory, the gravity gradient of a localized (spherical) mass anomaly is a conventional dipole field. It can be shown that gravity gradient ($\partial \bar{g}/\partial v$) with respect to a fixed direction $\bar{v}$ is equivalent to the electrical field distribution if: 1) a uniform electrical field is applied in the direction parallel to the direction of $\bar{v}$; and 2) every mass is replaced with a dielectric with permittivity equal to that mass. Further, the "gravity dipole moment" of a mass anomaly is always oriented along the direction of the gravity gradient. From these principles, if a long tunnel is viewed as a collection of voids when exposed to a gravity gradient field, all gravity dipole moments cancel except for two equivalent masses located at the tunnel endpoints. These equivalent masses have equal and opposite sign. Hence, to distinguish the signature of a tunnel from localized small voids and other subsurface density variations (SSDVs), i.e., clutter, the detection of somewhat oblong (large length to diameter ratio) voids is required when the ground is exposed to a gravity gradient field having a fixed direction. This principle is illustrated in FIGS. 1, 2 and 3 as further discussed below.

Figure 1:
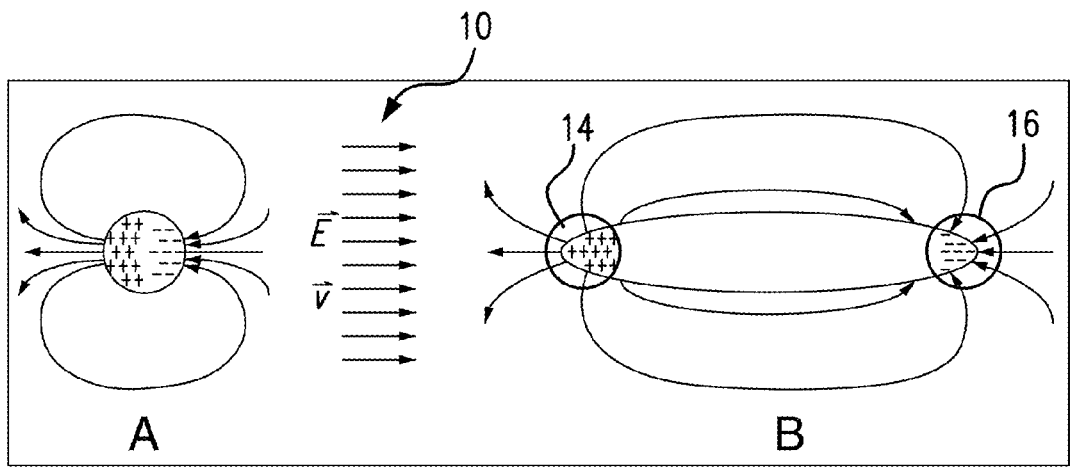
FIG. 1, comprised of FIGS. 1A and 1B, is a graphical representation of the gravity gradient field generated by dipolar points and polar source points resulting from a small void and a collection of successive voids (a tunnel) for a fixed direction running parallel to the collection of successive voids illustrating the principle utilized by the teachings of the present disclosure.

Referring now to FIG. 1, comprised of FIGS. 1A and 1B, a graphical representation can be seen of a gravity gradient field 10 having magnitude $\bar{E}$ and fixed direction $\bar{v}$ generated by a small void and producing the dipolar point 12 (illustrated in FIG. 1A) as well as generated by a collection of successive voids (i.e., tunnel) and producing two well-separated polar source points 14 and 16 (illustrated in FIG. 1B). The gravity gradient field 10 is shown having a fixed direction 17 running parallel to the two polar source points 14 and 16.

Figure 2:
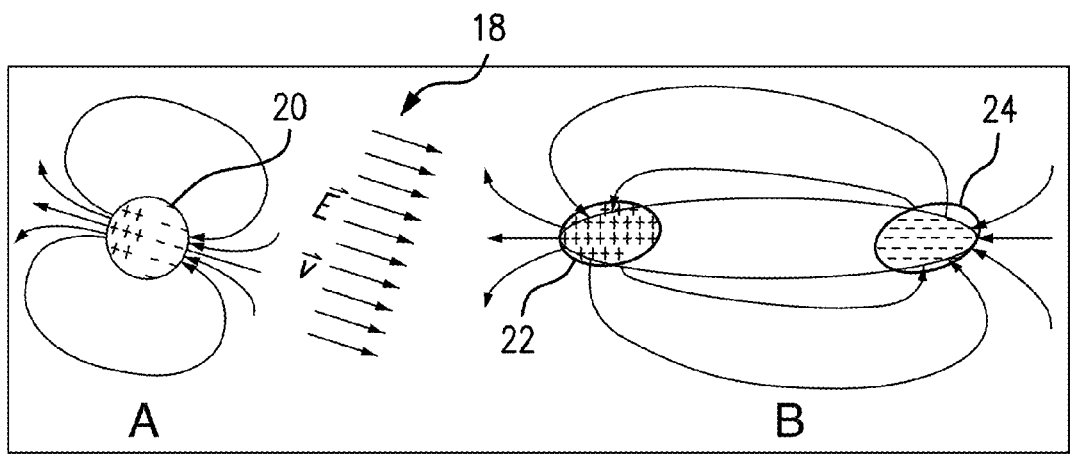
FIG. 2, comprised of FIGS. 2A and 2B, is a graphical representation of the gravity gradient field generated by dipolar points and polar source points resulting from a small void and a collection of successive voids (a tunnel) for a fixed direction running at an angle to the collection of successive voids illustrating the principle utilized by the teachings of the present disclosure.

In FIG. 2, comprised of FIGS. 2A and 2B, another graphical representation can be seen of a gravity gradient field 18 having magnitude $\bar{E}$ and fixed direction $\bar{v}$ generated by a small void and producing a dipolar point 20 (illustrated in FIG. 2A) as well as generated by a collection of successive voids (i.e., tunnel) and producing two well-separated polar source points 22 and 24 (illustrated in FIG. 2B). In contrast to the gravity gradient field 10 of FIG. 1, gravity gradient field 18 in FIG. 2 has a fixed direction $\bar{v}$ running at an angle to the length of the collection of successive voids. As a result, the dipolar point 20 and the two polar source points 22 and 24 appear to be somewhat skewed in FIG. 2 due to following the principle that the "gravity dipole moment" of a mass anomaly is always oriented along the direction of the gravity gradient field.

Figure 3:
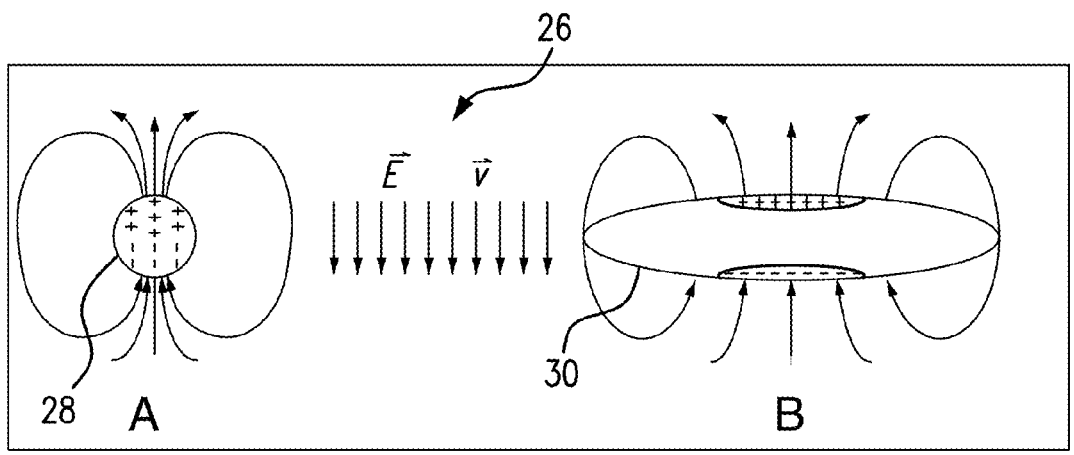
FIG. 3, comprised of FIGS. 3A and 3B, is a graphical representation of the gravity gradient field generated by dipolar points and polar source points resulting from a small void and a collection of successive voids (a tunnel) for a fixed direction running perpendicular to the collection of successive voids illustrating the principle utilized by the teachings of the present disclosure.

In FIG. 3, comprised of FIGS. 3A and 3B, another graphical representation can be seen of a gravity gradient field 26 having magnitude $\bar{E}$ and fixed direction $\bar{v}$ generated by a small void and producing a dipolar point 28 (illustrated in FIG. 3A) as well as generated by a collection of successive voids (i.e., tunnel) and producing what appears to now also be a dipolar point 30 (illustrated in FIG. 3B). In contrast to the gravity gradient field 10 of FIG. 1 and the gravity gradient field 18 of FIG. 2, gravity gradient field 26 in FIG. 3 has a fixed direction $\bar{v}$ running perpendicular to the length of the collection of successive voids. As a result, the collection of successive voids now behaves like a collection of dipolar point in following the principle that the "gravity dipole moment" of a mass anomaly is always oriented along the direction of the gravity gradient field.

Hence, when the direction of the gravity gradient field is along a tunnel length, tunnels appear as two polar sources (two well-separated equivalent masses), whereas localized anomalies (clutter) appear as dipolar sources (two infinitesimally-separated equivalent masses). When the direction of the gravity gradient field is perpendicular to the length of the tunnel, all anomalies appear as dipolar sources.

Figure 4:
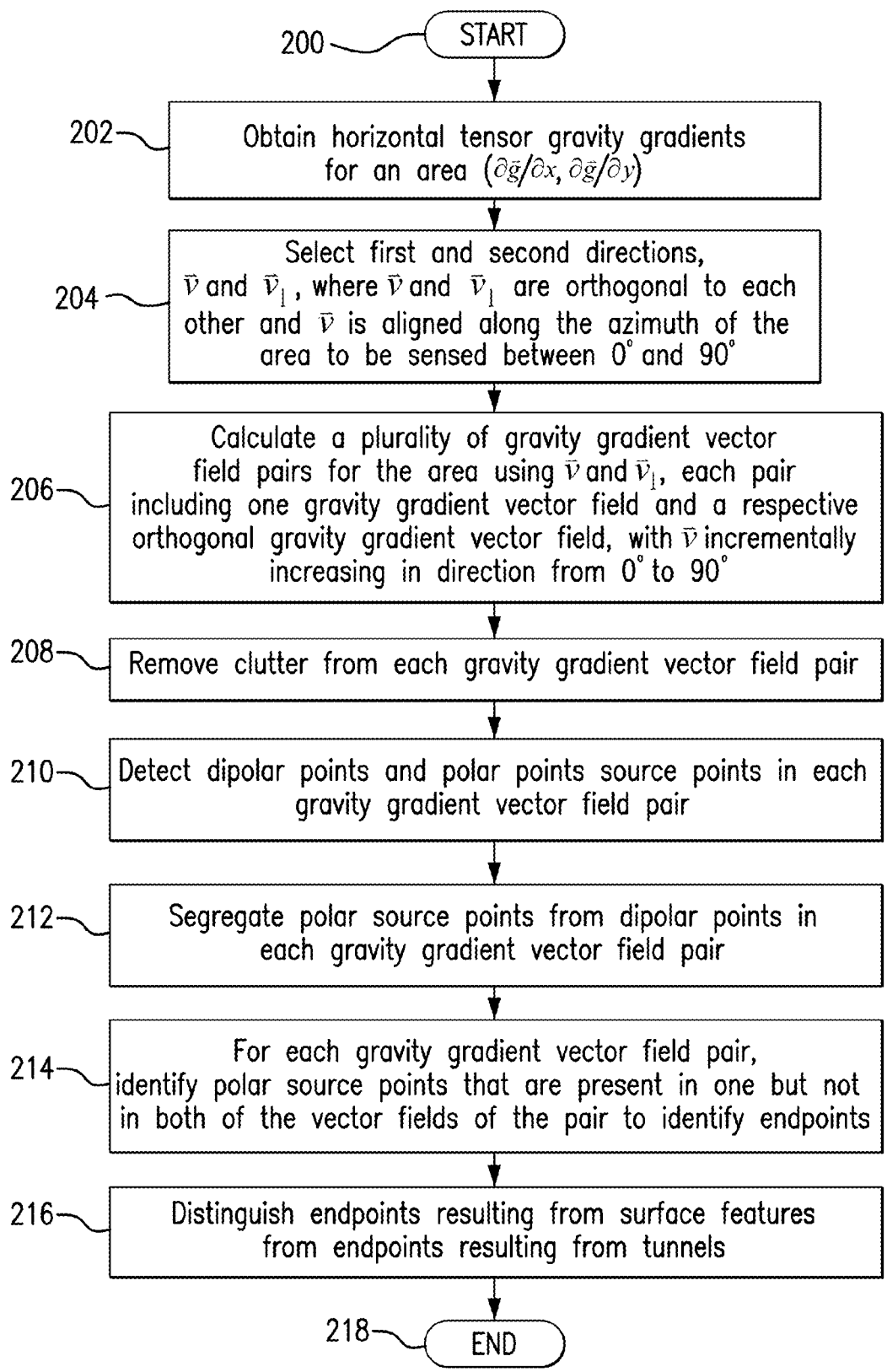
FIG. 4 is a flowchart showing one embodiment of a series of steps that may be performed to detect tunnels in accordance with the teachings of the present disclosure.

In referring now to FIG. 4, a flow chart can be seen showing the details of one embodiment of a series of steps of a process that may be performed to facilitate tunnel detection in accordance with the teachings of the present disclosure. At step 200, the process is initiated. At step 202, horizontal tensor gravity gradients (x and y directions) are obtained for the area of interest. Step 202 in one embodiment may be accomplished by way of using a gradiometer moving slowly over the area and measuring the gravity gradients in the x and y directions. However, alternatively, step 202 may be accomplished by way of using an accelerometer (e.g., a gravimeter) moving at a known velocity over the area to measure the gravity gradients in the x and y directions. Typically these measurements are performed from a moving platform such as from an aircraft flying over the area of interest. From step 202, the process moves to step 204. At step 204, first and second directions, $\bar{v}$ and $\bar{v}_\perp$ vectors respectively, are selected where the first and second directions are orthogonal to each other. In one embodiment, it is preferable that the first and second directions, $\bar{v}$ and $\bar{v}_\perp$, may be selected arbitrarily with the first direction $\bar{v}$ being aligned along the azimuth of the area between 0 degrees and 90 degrees.

From step 204, the process moves to step 206. At step 206, a plurality of gravity gradient vector field pairs are calculated for the area with each gravity gradient vector field pair including one gravity gradient vector field and a respective orthogonal gravity gradient vector field. In one embodiment, the plurality of gravity gradient vector field pairs are first calculated based on the first and second directions $\bar{v}$ and $\bar{v}_\perp$ as initially selected. Then, once calculated for the initial first and second directions $\bar{v}$ and $\bar{v}_\perp$, each subsequent gravity gradient vector field pair is recalculated with the first direction $\bar{v}$ incrementally increasing in direction from 0 degrees to 90 degrees in 5 degree increments along with the respective second direction $\bar{v}_\perp$ correspondingly increasing to remain orthogonal to the first direction $\bar{v}$. It should be understood from those skilled in the gravimetric and geophysical arts that gravity gradients may be measured using any number of varying well known and commonly used techniques.

For example, a gravity gradient vector field is represented by $\partial \bar{g}/\partial v$ and can be measured directly by a gradiometer positioned in a moving platform such as an aircraft. This value, $\partial \bar{g}/\partial v$, is equal to the time derivative of the gravity measurement performed from a moving platform as represented by $$\frac{\partial \bar{g}}{\partial v} = \frac{1}{V} \cdot \frac{\partial \bar{g}}{\partial t}$$

where V is the velocity of the gravity detector with respect to the ground. Typically, the gradiometer is assumed to be quasi-stationary over a given time window, limiting the speeds at which the platform can move.

Alternatively, using the chain rule, the gravity gradient tensor can be estimated using a gravimeter moving in a known direction (with a known speed). And then the gravity gradient vector field calculated from the gravity gradient tensor. This can be shown mathematically using a model having a moving platform. For a platform with velocity $\bar{v}(t)$ and location $\bar{g}_0$ at time $t_0$, the time-varying position is given by:

$$\bar{r}(t) = \bar{r}_o + \int_{t_o}^{t} \bar{v}(\tau) d\tau \qquad \text{Equation 1}$$

Suppose that we measure gravity at points $\bar{r}(t)$. By the chain rule, the time-derivative of gravity on the moving platform is given by:

$$\frac{\partial \bar{g}[\bar{r}(t)]}{\partial t} = \bar{\bar{G}} \cdot \bar{v}(t) \qquad \text{Equation 2}$$

Where:

$$\bar{\bar{G}} = \begin{bmatrix} \frac{\partial g_x}{\partial x} & \frac{\partial g_x}{\partial y} & \frac{\partial g_x}{\partial z} \\ \frac{\partial g_y}{\partial x} & \frac{\partial g_y}{\partial y} & \frac{\partial g_y}{\partial z} \\ \frac{\partial g_z}{\partial x} & \frac{\partial g_z}{\partial y} & \frac{\partial g_z}{\partial z} \end{bmatrix} \qquad \text{Equation 3}$$

is the gravity gradient tensor. In other words, $$\frac{1}{\|\bar{v}\|} \frac{\partial \bar{g}}{\partial t}$$

is the gravity gradient vector field in the direction of flight, $$\frac{\bar{v}(t)}{\|\bar{v}(t)\|}.$$

Let $T_s$ denote the set of times where the gravimeter has the same position, i.e., $\bar{r}(t) = \bar{r}_s \forall t \in T_s$, for some constant $\bar{r}_s$. For instance, the aircraft may make two passes over the same region in perpendicular flight directions. All time samples over this region:

$$\int_{T_s} \frac{\partial \bar{g}[\bar{r}(t)]}{\partial t} \bar{v}^T(t) dt = \bar{\bar{G}}(\bar{r}_s) \int_{T_s} \bar{v}(t) \bar{v}(t)^T dt$$

belong to the set $T_s$. Then, $$\Rightarrow \bar{\bar{G}}(\bar{r}_s) \left[ \int_{T_s} \frac{\partial \bar{g}[\bar{r}(t)]}{\partial t} \bar{v}^T(t) dt \right] \left[ \int_{T_s} \bar{v}(t) \bar{v}(t)^T dt \right]^{-1} \qquad \text{Equation 4}$$

provides a means to estimate the gravity gradient tensor that is fully general. For instance, suppose that flight of the aircraft is only along a single direction. Then the pseudo-inverse of the matrix on the right will give an estimate of $\bar{\bar{G}}$ in the flight direction only.

It is further demonstrated mathematically and confirmed numerically that the relative error in estimating the gravity gradient tensor in this way is bounded above by $\Delta v_{max}/v$ where $\Delta v_{max}$ is the maximum estimated error in determining platform velocity and $v$ is the actual velocity. Therefore, gravity gradient tensor estimate error decreases with increasing velocity when known motion is incorporated with the measurements. Typical measurement procedures assume that the platform is quasi-stationary and an increase in velocity causes gravity gradient estimates to break down. The derivation begins by assuming that the platform is moving. Therefore, when using a gravimeter to estimate $\bar{\bar{G}}$, it is not platform motion itself that causes system errors but errors in estimating platform velocity. Let the estimated velocity be $\hat{v}(t) = \bar{v}(t) + \Delta \bar{v}(t)$. Then the error in estimating $\bar{\bar{G}}(\bar{r}_s)$ is:

$$\Delta \bar{\bar{G}}(\bar{r}_s) = \left[ \int_{T_s} \frac{\partial \bar{g}[\bar{r}(t)]}{\partial t} \hat{v}^T(t) dt \right] \left[ \int_{T_s} \hat{v}(t) \hat{v}(t)^T dt \right]^{-1} - \left[ \int_{T_s} \frac{\partial \bar{g}[\bar{r}(t)]}{\partial t} \bar{v}^T(t) dt \right] \left[ \int_{T_s} \bar{v}(t) \bar{v}(t)^T dt \right]^{-1} \qquad \text{Equation 5}$$

To reduce this expression to a manageable quantity, use the first-order Neumann expansion:

$$(\bar{\bar{A}} + \bar{\bar{B}})^{-1} \approx \bar{\bar{A}}^{-1} - \bar{\bar{A}}^{-1} \bar{\bar{B}} \bar{\bar{A}}^{-1} \qquad \text{Equation 6}$$

which holds when the tensor $\bar{\bar{B}}$ is "small". Applying Equation 6 to Equation 5 (where all tensors involving $\Delta \bar{v}$ are considered "small") yields:

$$\Delta \bar{\bar{G}}(\bar{r}_s) \sim -\left[ \int_{T_s} \Delta \bar{v}(t) \bar{v}^T(t) dt \right] \left[ \int_{T_s} \bar{v}(t) \bar{v}(t)^T dt \right]^{-1} \qquad \text{Equation 7}$$

Using the triangle inequality for matrix norms, we have:

$$\frac{\|\Delta\overline{\overline{G}}(\vec{r}_s)\|}{\|\overline{\overline{G}}(\vec{r}_s)\|} \leq \frac{\left\|\int_{T_s} \Delta\vec{v}(t)\vec{v}^T(t)\,dt\right\|}{\left\|\int_{T_s} \vec{v}(t)\vec{v}^T(t)\,dt\right\|} \quad \text{Equation 8}$$

In order to generate Equation 8, we have only assumed that velocity estimate error $\Delta\vec{v}$ is small. To further investigate Equation 8, suppose that the platform passes the location of interest along perpendicular directions with constant velocity. Then:

$$\frac{\|\Delta\overline{\overline{G}}(\vec{r}_s)\|}{\|\overline{\overline{G}}(\vec{r}_s)\|} \leq \frac{1}{v^2 M(T_s)}\left\|\int_{T_s} \Delta\vec{v}(t)\vec{v}^T(t)\,dt\right\| \quad \text{Equation 9}$$

where $M(T_s)$ is the measure of the set $T_s$ (roughly speaking, the number of points in the set). Applying the triangle inequality several times to Equation 9 yields:

$$\frac{\|\Delta\overline{\overline{G}}(\vec{r}_s)\|}{\|\overline{\overline{G}}(\vec{r}_s)\|} \leq \frac{1}{v^2 M(T_s)}\left\|\int_{T_s} \Delta\vec{v}(t)\vec{v}^T(t)\,dt\right\| \leq \quad \text{Equation 10}$$

$$\frac{1}{v^2 M(T_s)}\int_{T_s} \|\Delta\vec{v}(t)\vec{v}^T(t)\|\,dt =$$

$$\frac{1}{v^2 M(T_s)}\int_{T_s}\|\Delta\vec{v}(t)\|\|\vec{v}^T(t)\|\,dt \leq \frac{1}{v^2 M(T_s)}\Delta v_{max} v \int_{T_s}(1)\,dt$$

where $\Delta v_{max}$ is the maximum error in estimating platform velocity. Simplifying the last line of Equation 10, we have:

$$\frac{\|\Delta\overline{\overline{G}}(\vec{r}_s)\|}{\|\overline{\overline{G}}(\vec{r}_s)\|} \leq \frac{\Delta v_{max}}{v} \quad \text{Equation 11}$$

which is the desired result. Again, in order to derive Equation 8, we had only to assume that the error in estimating velocity was small. To estimate Equation 11, we first assumed the flight paths passing over the same point are perpendicular. If the paths are not perpendicular, Equation 11 scales directly proportional to the condition number of the matrix inverted in Equation 3 (accounting for the supposed rank). Finally, a constant platform velocity was assumed.

Equation 11 further illustrates that a moving gravimeter can be used to measure the gravity gradient tensor (in addition to a quasi-stationary gradiometer). By using the local topography as a position reference, platform velocity can be estimated to a high degree of accuracy as long as the platform does not translate significantly in the time it takes to position data, e.g., LIDAR could be utilized. Therefore, the velocity estimate ($\Delta\vec{v}$) can be assumed bounded over a reasonable range of velocities. Within this range of velocities, the error in estimating $\overline{\overline{G}}$ using Equation 11 decreases with increasing velocity until a bound is reach. This bound is determined by the ability of the instrumentation to measure velocity. In other words, error=$\Delta v/v$, for $0 < v < v_{max}$.

It should further be noted that a moving gravimeter is not necessarily a more accurate device than using a gradiometer for measuring $\overline{\overline{G}}$ per se, however, its foundational assumption (that the platform is moving) is more realistic than the assumptions made in employing the gradiometer (that the platform is not moving). With that said, velocity cannot be increased arbitrarily. Beyond the need to estimate velocity with a bounded accuracy, a minimum amount of averaging at a single location must be performed to counter any noise that is unrelated to motion. To accommodate the averaging, the point $\vec{r}_s$ must be expanded to include a small region over which the gravity gradient tensor can be assumed constant. The faster the platform velocity, the larger this region must be. Therefore, severe increases in velocity must be avoided to prevent resolution degradation.

From step 206, the process moves on to step 208. At step 208, clutter is processed from each of the plurality of gravity gradient vector field pairs. In one embodiment, clutter may be processed by way of applying a probability tomography analysis on each of the gravity gradient vector field pairs based on the gravity of equivalent masses. Processing the gravity gradient vector field pairs in this manner will serve to enhance the resolution by removing and/or reducing the clutter (i.e., subsurface density variations "SSDVs" or otherwise referred to as localized anomalies). In applying a probability tomography analysis on the gravity gradient vector field pairs, the Source Pole Occurrence Probability (SPOP) is required to be defined. To define the SPOP, the SPOP is first to be thought of as an indicator of equivalent masses. Then, the SPOP may be represented by:

$$\eta(\vec{r}, u) = \frac{\int_S \|\vec{r} - \vec{r}_s\|^{-3}(\vec{r} - \vec{r})^T \frac{\partial \vec{g}(\vec{r}_s)}{\partial v}\,dS}{\sqrt{\int_S \frac{\partial \vec{g}(\vec{r}_s)}{\partial v}^T \frac{\partial \vec{g}(\vec{r}_s)}{\partial v}\,dS \int_S \|\vec{r} - \vec{r}_s\|^{-4}\,dS}} \quad \text{Equation 12}$$

where $\vec{r}$ is a point in the image volume of the gravity gradient vector field, S is the region over which the measurement points are collected, $\vec{r}_s$ is a point in S, and v is the direction.

From step 208, the process moves on to step 210. At step 210, dipolar points and polar source points in each of the gravity gradient vector field pairs are detected. In referring now to FIG. 5, a graphical representation of a gravity gradient vector field pair can be seen after having been processed by the probability tomography analysis expressed by Equation 12 wherein η (the SPOP) is shown on a linear scale for a gravity gradient vector field pair showing the first and second directions $\overline{v}$ and $\overline{v}_\perp$ ($\overline{v}$ being parallel to the tunnel, left image; and $\overline{v}_\perp$ being perpendicular to the tunnel, right image). Dipolar points 32 and polar source points 34 can readily be seen. The first and second directions $\overline{v}$ and $\overline{v}_\perp$ are illustrated by gradient lines 36 and 38 respectively.

From step 210 in FIG. 4, the process moves on to step 212. At step 212, the polar source points and the dipolar points are segregated in order to associate the polar source points for further analysis. From step 212, the process moves on to step 214. At step 214, for each gravity gradient vector field pair, polar source points are identified that are present in one but not in both of the gravity gradient vector fields for the first and second directions $\overline{v}$ and $\overline{v}_\perp$. Such polar source points thereby identifying endpoints to a tunnel. In one embodiment, such polar source points are identified by way of using a symmetry argument through visual inspection of each gravity gradient vector field pair and then repeated for each of the subsequent gravity gradient vector field pairs.

Figure 5:
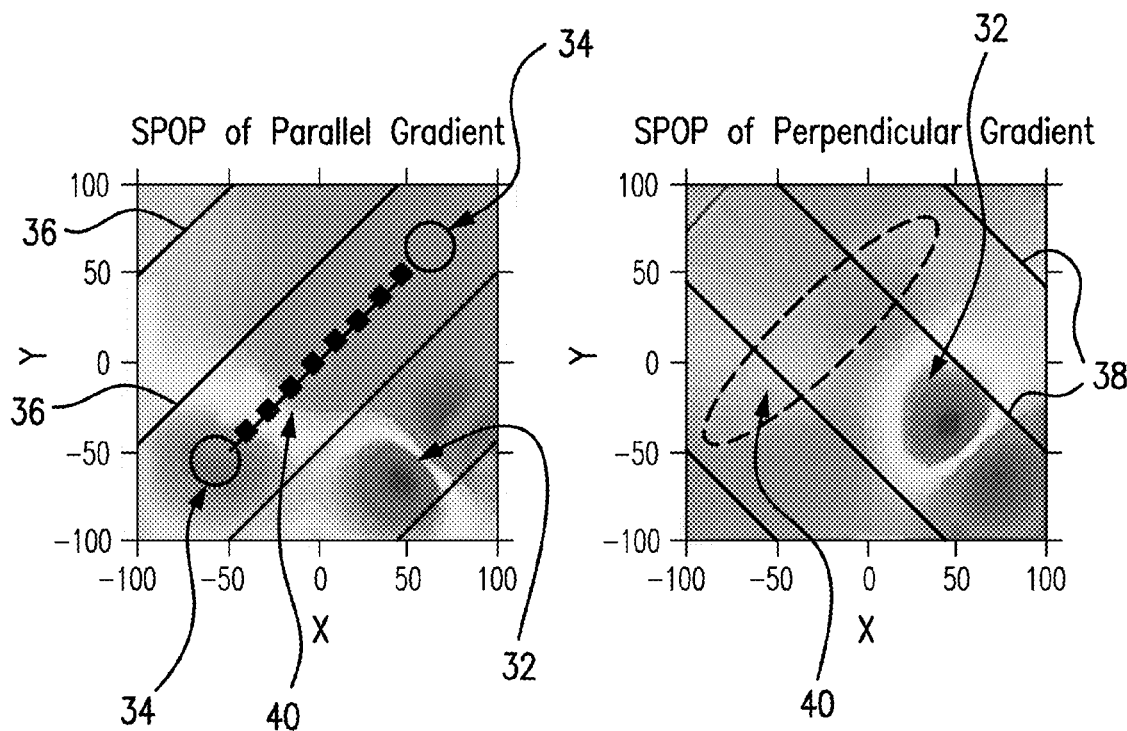
FIG. 5 is a graphical representation of a gravity gradient vector field pair after processing the clutter by applying probability tomography to estimate the source pole occurrence probability based on the gravity of equivalent masses in accordance with the teachings of the present disclosure.

From FIG. 5, it can readily be seen using a symmetry argument between the two images that dipolar points 32 exist in both images but the polar source points 34 only exist in the image on the left depicting the first direction $\overline{v}$ running parallel to a tunnel 40. The tunnel 40 is running between the polar source points 34. The polar source points 34 can be seen to be absent from the image on the right depicting the second direction $\bar{v}_\perp$ running perpendicular to the tunnel 40 (the tunnel being absent from the image and depicted in ghost form for clarity).

Furthermore, the orientation of the dipolar points 32 is always aligned with the gradient direction. This is easily detected for dipolar points 32 in the lower right corner of the images of FIG. 5. Because the dipolar points 32, which may appear as "splotches", change orientation with the gradient direction, the user (or, in an alternative embodiment, perhaps with software performing further post-processing) can recognize this as a dipolar point 32 (a localized anomaly) and may even subtract it from the data. The tunnel 40, on the other hand, has a strong signature in the parallel image, where the SPOP shows two well-separated masses of equal magnitude and opposite sign. The true location of the tunnel 40 is as indicated running between polar source points 34. The polar source points 34 form the endpoints of the tunnel 40.

Figure 6:
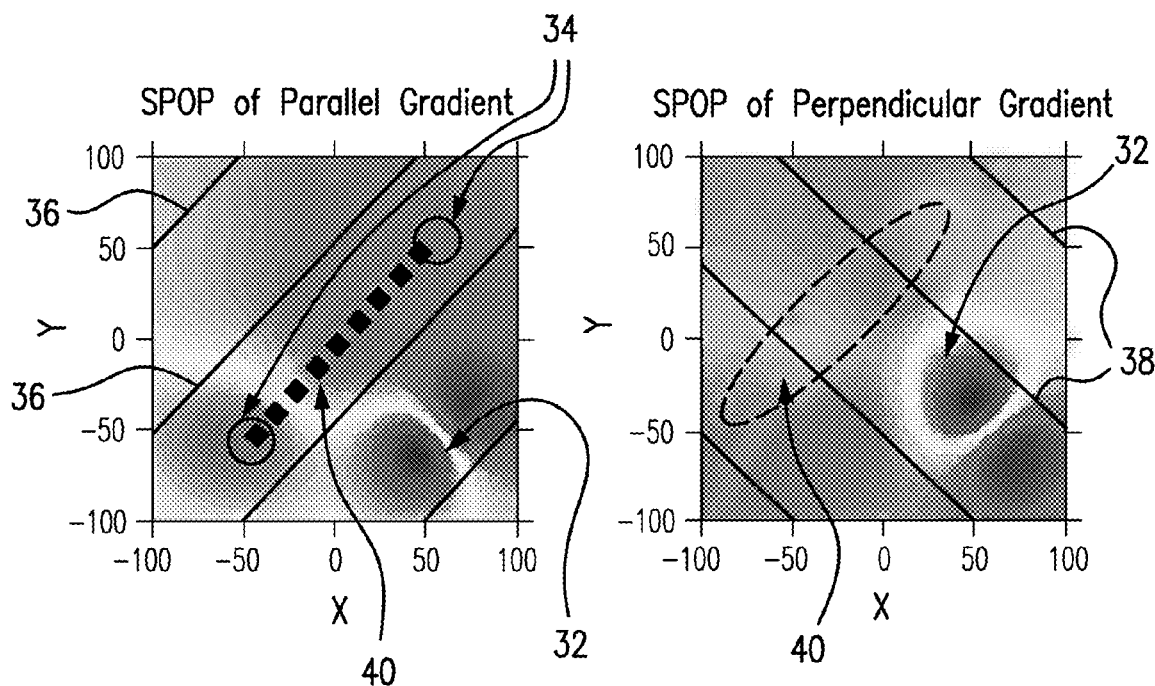
FIG. 6 is a graphical representation of the same gravity gradient vector field pair of FIG. 5 but with first and second gradient directions rotated by 5 degrees so that the first gradient direction is no longer perfectly aligned with the tunnel.

In referring now to FIG. 6, a graphical representation of the same gravity gradient vector field pair of FIG. 5 that was processed by the probability tomography analysis expressed by Equation 12, but with first and second gradient directions $\bar{v}$ and $\bar{v}_\perp$ rotated by 5 degrees so that the first gradient direction $v$ is no longer perfectly aligned with the tunnel 40. The signature of the tunnel 40 is still plainly visible and its orientation is still correct. This illustrates that relatively few directions of $\bar{v}$ and $\bar{v}_\perp$ need to be tested in order to successfully detect the polar source points 34 indicative of the tunnel 40.

Hence, the probability tomography approach automatically removes the majority of the clutter typically present in initial raw data. The remaining clutter is easily distinguished using the symmetry argument. In applying a polar model in this manner, any sources that are truly dipolar (SSDVs) appear in the form of two closely placed (ideally, infinitesimally close) masses of opposite sign and can be seen in both the gravity gradient vector fields for the first and second directions $\bar{v}$ and $\bar{v}_\perp$.

From step 214 in FIG. 4, the process moves on to step 216. At step 216, the polar source points 34 forming the endpoints are further distinguished as resulting from either surface features (e.g., ditches, railroads, bridges, other known tunnels, etc.) or from actual new tunnels. In one embodiment, surface features may be distinguished through additional visual inspection of the SPOP of the gravity gradient vector field pairs by trained analysts. In alternative embodiments, surface features may be distinguished through further post-processing by software that may further investigate linear features. From step 216, the process moves on to step 218. At step 218, the process ends completing the method for detecting underground tunnels in accordance with the teachings of the present disclosure.

The present disclosure includes that contained in the appended claims, as well as that of the foregoing description. Although this disclosure has been described in its preferred form in terms of certain embodiments with a certain degree of particularity, alterations and permutations of these embodiments will be apparent to those skilled in the art. Accordingly, it is understood that the above descriptions of exemplary embodiments does not define or constrain this disclosure, and that the present disclosure of the preferred form has been made only by way of example and that numerous changes, substitutions, and alterations in the details of construction and the combination and arrangement of parts may be resorted to without departing from the spirit and scope of the invention.

What is claimed is:

1. A method for detecting tunnels within an area comprising the steps of:
   providing, with one or more of a gradiometer and an accelerometer, horizontal tensor gravity gradients for the area;
   calculating, using the gradiometer, a plurality of gravity gradient vector field pairs from the horizontal tensor gravity gradients, each gravity gradient vector field pair including one gravity gradient vector field and a respective orthogonal gravity gradient vector field;
   detecting dipolar points and polar source points in each of said one and respective orthogonal gravity gradient vector fields for each gravity gradient vector field pair;
   identifying said polar source points that are present in one but not in both of said one gravity gradient vector field and said respective orthogonal gravity gradient vector field for each gravity gradient vector field pair to identify endpoints; and
   distinguishing said endpoints resulting from surface features from said endpoints resulting from tunnels;
   wherein the step of detecting dipolar points and polar source points further comprises the step of segregating said polar source points from said dipolar points in each of said one and respective orthogonal gravity gradient vector fields.

2. The method of claim 1, wherein the step of segregating said polar source points from said dipolar points in each of said one and respective orthogonal gravity gradient vector fields comprises visually inspecting said one and said respective orthogonal gravity gradient vector fields.

3. The method of claim 1, wherein the step of detecting dipolar points and polar source points initially comprises the step of processing the clutter in said one and said respective orthogonal gravity gradient vector fields of each of the plurality of gravity gradient vector field pairs.

4. The method of claim 3, wherein the step of processing the clutter in the plurality of gravity gradient vector field pairs comprises performing a probability tomography analysis for source pole occurrence probability (SPOP) on each of the gravity gradient vector field pairs.

5. The method of claim 4, wherein the step of detecting dipolar points and polar source points further comprises the step of segregating said polar source points from said dipolar points in said one and said respective orthogonal gravity gradient vector fields for each of said plurality of gravity gradient vector field pairs.

6. The method of claim 5, wherein the step of calculating a plurality of gravity gradient vector field pairs is comprised of the steps of:
   selecting first and second gradient directions perpendicular to each other, said first gradient direction aligned along azimuth between 0 degrees and 90 degrees;
   calculating said gravity gradient vector fields based on said first and second gradient directions; and
   repeating the calculations for said gravity gradient vector field pairs at subsequent incremental first and second gradient directions ranging from 0 degrees to 90 degrees.

7. The method of claim 4, wherein said probability tomography analysis is based on the gravity of equivalent masses.

8. A method for detecting tunnels within an area comprising the steps of:
   providing, with one or more of a gradiometer and an accelerometer, horizontal tensor gravity gradients for the area;

calculating, using the gradiometer, a plurality of gravity gradient vector field pairs from the horizontal tensor gravity gradients, each gravity gradient vector field pair including one gravity gradient vector field and a respective orthogonal gravity gradient vector field;

performing a probability tomography analysis for source pole occurrence probability (SPOP) on each of said one and said respective orthogonal gravity gradient vector fields of each of said plurality of gravity gradient vector field pairs;

detecting dipolar points and polar source points in each of said one and respective orthogonal gravity gradient vector fields for each gravity gradient vector field pair; and identifying said polar source points that are present in one but not in both of said one gravity gradient vector field and said respective orthogonal gravity gradient vector field for each gravity gradient vector field pair to thereby detect the tunnels;

wherein the step of detecting dipolar points and polar source points further comprises the step of segregating said polar source points from said dipolar points in each of said one and respective orthogonal gravity gradient vector fields.

9. The method of claim 8, wherein the step of segregating said polar source points from said dipolar points in each of said one and respective orthogonal gravity gradient vector fields comprises visually inspecting each of said one and said respective orthogonal gravity gradient vector fields within each pair.

10. The method of claim 8, wherein the step of calculating a plurality of gravity gradient vector field pairs is comprised of the steps of:

selecting first and second gradient directions perpendicular to each other, said first gradient direction aligned along azimuth between 0 degrees and 90 degrees;

calculating said gravity gradient vector fields based on said first and second gradient directions; and repeating the calculations for said gravity gradient vector field pairs at subsequent incremental first and second gradient directions ranging from 0 degrees to 90 degrees.

11. The method of claim 8, wherein the step of identifying further comprises the step of distinguishing said polar source points resulting from surface features from polar source points resulting from tunnels.

12. A method for detecting tunnels within an area comprising the steps of:

calculating, using a gradiometer, a plurality of gravity gradient vector field pairs for the area, each gravity gradient vector field pair comprising two vector fields orthogonal to one another, obtained using one or more of the gradiometer and an accelerometer;

performing a probability tomography analysis for source pole occurrence probability (SPOP) on each of said plurality of gravity gradient vector field pairs;

detecting dipolar points and polar source points in each of said gravity gradient vector field pair; and identifying said polar source points that are present in one but not in both of said two vector fields for each of said plurality of gravity gradient vector field pairs to thereby detect the tunnels; wherein the step of calculating a plurality of gravity gradient vector field pairs is comprised of the steps of:

selecting first and second gradient directions perpendicular to each other, said first gradient direction aligned along azimuth between 0 degrees to 90 degrees;

calculating said gravity gradient vector fields based on said first and second gradient directions; and repeating the calculations for said gravity gradient vector field pairs at subsequent incremental first and second gradient directions ranging from 0 degrees to 90 degrees.

13. The method of claim 12, wherein the step of identifying further comprises the step of distinguishing said polar source points resulting from surface features from polar source points resulting from tunnels.

* * * * *